May 10, 1960     E. WILDHABER     2,935,886
ENVELOPING WORM GEARING

Filed Sept. 9, 1957     2 Sheets-Sheet 1

INVENTOR:
Ernst Wildhaber

May 10, 1960  E. WILDHABER  2,935,886
ENVELOPING WORM GEARING
Filed Sept. 9, 1957  2 Sheets-Sheet 2 known art

INVENTOR:
Ernest Wildhaber

United States Patent Office 2,935,886
Patented May 10, 1960

2,935,886
ENVELOPING WORM GEARING
Ernest Wildhaber, Brighton, N.Y.

Application September 9, 1957, Serial No. 682,804

18 Claims. (Cl. 74—458)

The present invention relates to enveloping worm gearing, wherein an hourglass or throated worm engages a wormgear. Because the wormgear generally has concave tooth bottoms and envelops the worm, such gearing is sometimes called double-enveloping. Particularly it relates to enveloping wormgear pairs whose axes are at right angles to one another.

It has been commonly assumed that in conventional Cone or Hindley worm gearing the tooth contact is in the midplane of the wormgear and extends through the entire length of the worm. Applicant has demonstrated mathematically, however, that the tooth contact, which carries the load, follows a diagonal path. In the Cone or Hindley enveloping worm gearing this path crosses the center line of the worm gearing; and the point where this path crosses the center line is one end of the path of tooth contact. Applicant has demonstrated mathematically that at this point in the midplane of the wormgear the contacting tooth surfaces are almost counterparts of one another.

It is at this point, however, in the Cone or Hindley type worm gearing that the mating tooth surfaces start to intersect and interfere with one another. They intersect in the midplane of the wormgear. They intersect at small angles which vary along the length of the worm. The only reason that the tooth surfaces of the Cone or Hindley worm and wormgear do not interfere with one another beyond the midplane is because the interfering portions are automatically cut away in the production of the wormgear; for it is the conventional practice to hob the wormgear with a hob essentially like the worm; and such a hob will automatically produce wormgear teeth that will mesh with a worm, that corresponds to the hob, without interference with the thread of the worm. Nevertheless, because the interfering tooth portions are cut away the tooth contact ceases at the midplane in the conventional Cone or Hindley type worm gearing. At most, therefore, only half the length of the wormgear teeth will be in contact during operation. This limits the load-carrying capacity of such gearing and affects its life.

Other known types of enveloping worm gearing are either difficult and expensive to produce, and/or also are limited in their load-carrying capacity and life.

One object of the present invention is to devise a new tooth shape with improved characteristics, such as longer duration of contact and increased load capacity. A further object is to contribute to the exact understanding of such drives so that design advantages can be secured. A further aim is to devise enveloping worm gearing with intimate tooth contact, wherein the working portion of a gear tooth is more than half of its side surface and occupies the major part of said side surface.

Other aims are to devise enveloping worm gearing wherein the thread sides of the worm have each a constant profile in a surface of revolution offset from the center line, and to devise enveloping worm gearing with improved wear and adjustment characteristics. Further aims will appear in the course of the specification and in the recital of the appended claims. These aims and objects may be attained singly or in any combination.

In the drawings:

Figures 1 to 4 are diagrams explanatory of the principles underlying the present invention.

Figures 5, 6 and 7 are corresponding views illustrating a worm and mating wormgear constructed according to one embodiment of the present invention. Fig. 5 is a diagrammatic plan view of the gear pair, looking downwardly in Fig. 6, the drawing plane being parallel to the axes of the worm and gear. Fig. 6 is a front elevational view corresponding to Fig. 5, and partly a section along plane 6—6 of Fig. 5. Fig. 7 is a cross-section corresponding to Fig. 6 and viewed from right to left in Fig. 6, the cross-sectional plane containing the wormgear axis and being perpendicular to the worm axis.

Figure 10:
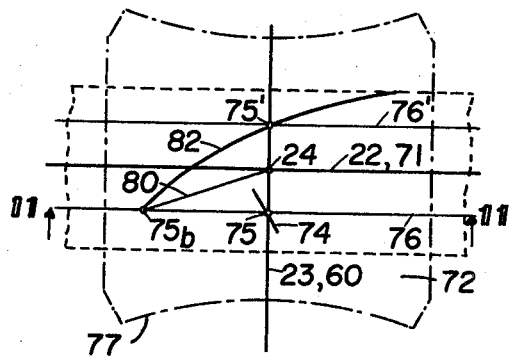
Figure 11:
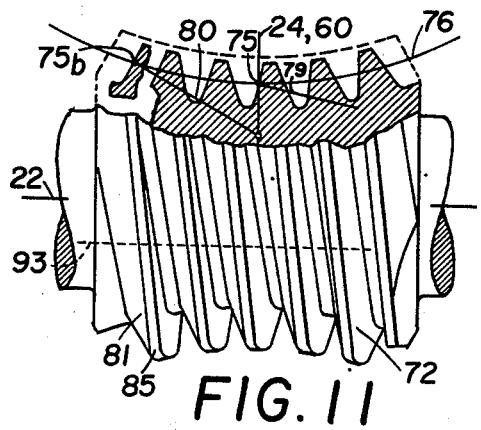
Figure 12:
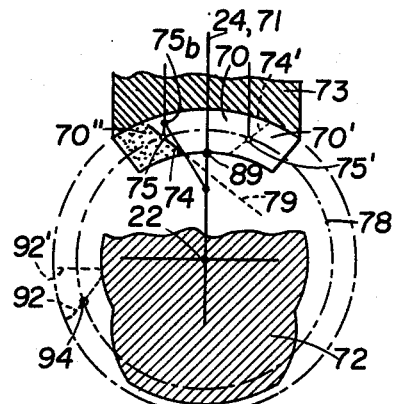

Figures 10 to 13 illustrate a further embodiment of the invention. Fig. 10 is a plan view similar to Fig. 5, the drawing plane being parallel to the axes of the worm and gear. Fig. 11 is a front elevational view corresponding to Fig. 10, and partly a section along lines 11—11 of Fig. 10. Fig. 12 is a fragmentary cross section corresponding to Fig. 11, looking along the worm axis from the right of Fig. 11. Its drawing plane contains the axis of the wormgear and is perpendicular to the worm axis.

Figure 2:
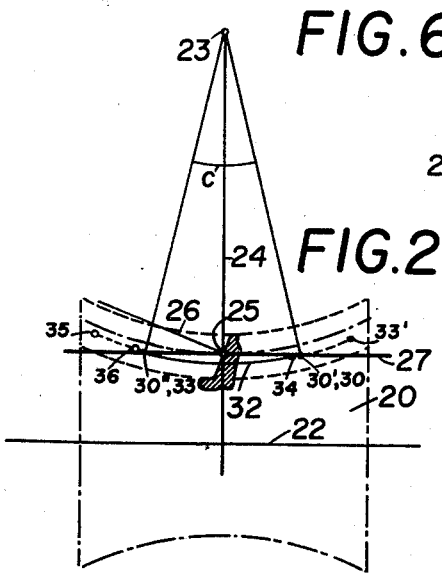
Figure 1:
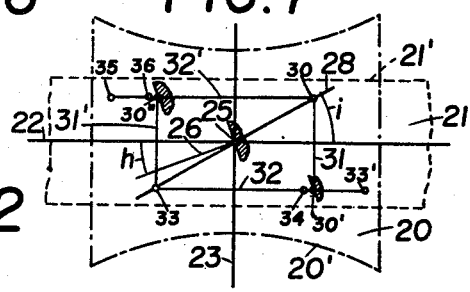

In Figures 1 and 2 the worm 20 is indicated by what may be called its pitch surface 20' and the wormgear 21 by dotted lines 21' demarking its width. The axis 22 of the worm 20 and the axis 23 of wormgear 21 are offset from each other and here shown at right angles to one another.

Enveloping worm gearing is capable of very intimate tooth contact. Figures 1 and 2 are intended to show up limitations and to indicate a way to avoid them, and to provide new understanding of this kind of gearing.

Line 24 intersects both axes 22, 23 at right angles and will be called the center line hereafter. Let it be assumed that point 25 of this center line is a point of contact between the tooth surfaces of the worm and wormgear. At this point, sometimes called the pitch point, the inclination of a worm thread matches the inclination of the mating gear tooth. The contacting tooth surfaces have a common surface normal 26 at point 25 and contact along a line. As the worm and wormgear turn on their axes in contact with each other their line of contact moves. And the various positions of these instantaneous lines of contact constitute the surface of action between the gear pair.

Let us consider the tooth action in a plane 27 that is laid through point 25 parallel to the axes 22, 23. The contact point in this plane follows some line 28, the path of contact, which is the intersection of the surface of action with plane 27. The indicated path of contact 28 extends diagonally across the region of the intermeshing teeth, at an angle to either of the projected axes 22, 23 (Fig. 1). The angle included with axis 22 of the worm is denoted with the symbol $i$, while the thread inclination and inclination of the projected tooth normal 26 to axis 22 is denoted with the symbol $h$. For convenience path 28 is shown as a straight line, but the results in the region immediately around point 25 apply also when this path is curved.

In one turning position tooth contact will be at point 30 of the path of contact 28. Point 30 then is a point common to both the worm and the wormgear. In operation point 30 of the worm describes a circle about the worm axis, which circle shows up as a straight line 31 in Fig. 1. It intersects plane 27 in a further point 30'.

On rotation of the worm and wormgear in contact with each other the contact point in plane 27 moves along the path of contact 28 to point 25 and beyond. Point 33 lies on the opposite side of the projected worm axis 22, at the same distance therefrom as point 30. While the point of contact moves from 30 to 33 the wormgear turns through an angle which shall be denoted with the symbol $a$. To restore the original turning position of the wormgear, it should be turned back through this angle $a$, whereby point 33 of the worm gear moves on a circle 32 to a position 33'. When now the worm turns through an angle which moves its point 30 to 30' on circle 31, the gear turns forward through an angle $b$ which is the product of the turning angle of the worm and the tooth ratio $m=n/N$ of the numbers of teeth of the worm and wormgear respectively. Point 33' then moves on circle 32 to a position 34. Points 34 and 30' are thus adjacent points of the tooth surfaces of the wormgear and worm respectively, both points lying on circle 32. Sections through the worm thread are indicated by small shaded portions. The tooth surface of the wormgear will be clear of the worm thread in this region when point 34 is to the left of point 30', as shown. The amount of clearance can be measured by the turning angle of the wormgear required to move point 34 to 30'. This angle, the clearance angle $z'$ equals the difference of angle 30'—23—33=$c$ and angle 34—23—33 (Fig. 2). The latter angle is $(a-b)$. Thus $z'=c-(a-b)$.

Let us now also determine the clearance angle $z''$ at the diametrically opposite point 30''. This point corresponds to the mesh point 33. Like point 33 it lies in plane 27, and can be obtained from point 33 of the worm by turning it about the worm axis 22 until it again lies in plane 27. The point thereby moves on a circle 31' identical with circle 31. During such turning motion of the worm the wormgear turns through the aforesaid angle $b$ in contact with the worm.

As the worm turns, the point of contact in plane 27 moves towards point 25. When motion continues until the contact point has moved from 33 to 30 the wormgear turns through the aforesaid angle $a$. Restoring the original turning position, where contact was at point 33, point 30 of the wormgear reaches a position 35 on circle 32'. And as the worm turns to displace its point 33 to point 30'', point 35 moves to position 36 on circle 32'. Points 30'' and 36 thus represent simultaneous positions of the worm thread and of the mating gear tooth. To clear, point 36 of the wormgear should be at the left of point 30'' of the worm, with the shown proportions.

The clearance angle $z''$, that is the turning angle 36—23—30'' about the wormgear axis 23, is the difference of angle 36—23—30 and angle 30''—23—30. It is $z''=(a-b)-c=-z'$; hence $$z'+z''=0 \qquad (1)$$

We conclude that there cannot be clearance at both points 30' and 30''. If there is clearance at 30'' there is interference at 30', by the same amount. In other words, the assumed mesh is not actually feasible, at least not past critical point 25. Even so it is believed to show up the trends and characteristics better than anything else.

As the average clearance $\tfrac{1}{2}(z'+z'')$ is zero we conclude that the curvature of the surfaces contacting at point 25 is identical on both members. In each section through point 25 of whatever direction the intersection curves have the same curvature.

Figures 3, 4:
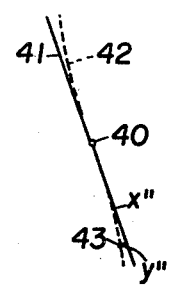

The term curvature is a well known mathematical concept. Fig. 3 shows two curves 38, 39 contacting at point 40 and having the same curvature at that point. They hug each other closely adjacent point 40 and generally pierce each other and depart on opposite sides. Thus curve 39 extends inside of concave curve 38 at its upper portion, and outside of it at its lower portion. The difference is best seen when one line is a straight line 41, Fig. 4. The other line 42 then generally has a point of inflection at contact point 40. It can be described by a characteristic equation that relates the distance $y''$ of any point 43 from straight line 41 to its distance $x''$ from contact point 40, measured along straight line 41. The equation is $y''=C''x''^3+ \ldots$; $C''$=constant where the dots stand for possible terms of higher order, terms in $x^4$ or $x^5$ etc. In the region immediately around point 40 the higher order terms have no importance.

The equation lacks a term in $x^2$ where lines 41, 42 have equal curvature. The curves 38, 39 (Fig. 3) depart in the same manner from each other.

To determine the clearance angles $z'$, $z''$ individually, we may describe the position of any considered point 30 by its coordinates $x$ and $y$, $x$ being the distance of point 30 from the projected gear axis 23 (Fig. 1); and $y$ being its distance from the projected worm axis 22. The described procedure is then gone through. And after developing each trigonometric function into a series the following equation may be obtained for the angles $z'$, $z''$ in radian measure:

$$z'=-\frac{2}{3}\frac{x^3}{R^2 \cdot r} \tan i(\tan i + \tan h) + \ldots$$
$$z''=-z' \qquad (2)$$

Herein $R$ and $r$ denote the pitch radii, that is the distances of pitch point 25 from the gear axis 23 and from the worm axis 22 respectively. The dots stand for possible terms of higher order. The negative sign indicates interference at point 30'. There is clearance however at 30''.

Figure 8:
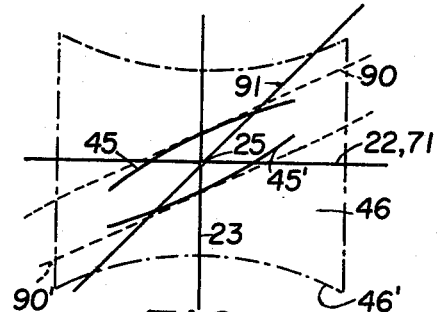
Figure 8 is a diagrammatic plan view similar to Fig. 5, showing a modification.

Unless we want to end tooth action right at 25, at the middle of the teeth, the path of contact should be displaced to bypass point 25. Thus the considered side of the teeth may have a path of contact 45, Fig. 8, on the pitch surface 46' of worm 46. The opposite side of the teeth then has a path of contact 45' that bypasses point 25 on the opposite side.

The designer's problem is then to find how much the critical point 25 should be bypassed. Tooth contact is the more intimate the closer the path of contact (45) comes to point 25. But the closer it comes the closer is also interference.

It is extremely cumbersome to determine interference, the intersection line of two tooth surfaces inclined only slightly to each other. Also, in general, interference may vary with the turning position, so that the problem is multiplied. And yet, the closer we can stay to interference, outside of it, the better and more intimate is the tooth contact.

In accordance with my invention I turn the problem around. Instead of starting from an assumed path of contact and determining the interference line therefrom, I start out from an assumed interference line and determine the path of contact therefrom. It will be shown that this is a relatively simple matter, especially when the axes of the worm drive are at right angles.

An interference line is assumed on the extended or actual side surface of a gear tooth, so that interference should not go beyond this line. Preferably interference is kept at that line in all turning positions where there is interference. In other words the interference line is part of the gear tooth and moves with it. In this way the mesh can be kept closest to this controlled interference, and a most intimate tooth contact is attained.

The worm thread which produces this assumed interference line continually passes through this line in all turning positions. It is the thread described by the interference line on the worm when the worm turns on its axis while the interference line turns about the wormgear axis as if it were the wormgear itself. That is, the turning ratio corresponds to the tooth ratio of the worm and gear. The wormgear itself is formed conjugate to this worm to transmit uniform motion between them. This will be further gone into hereafter.

It might be thought that the tooth contact between the worm and gear is continuously along the interference line. This contact however is not the tangential tooth contact which reliably transmits large loads. It is a mere edge contact, because the lead angle or longitudinal thread inclination of the worm changes together with its varying diameter. The worm thread passes through this line at a varying inclination to the wormgear tooth. This line is an intersection line, not a line of tangential tooth contact. And it is properly called interference line.

Figure 5:
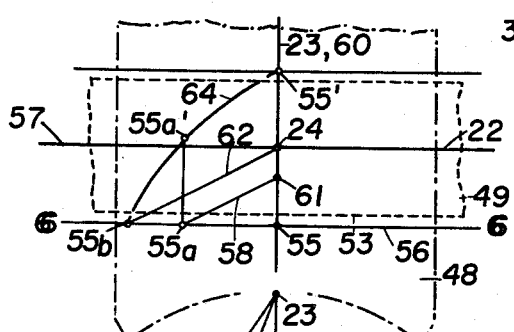
Figure 6:
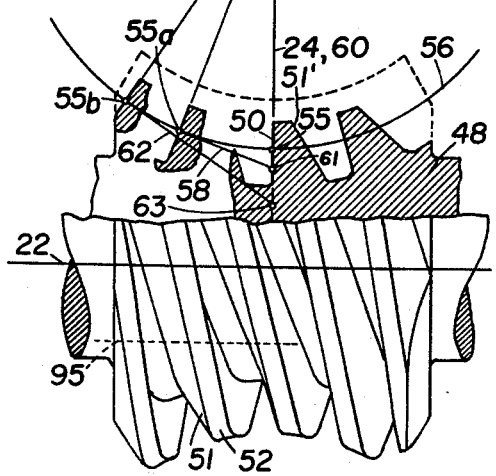

An embodiment of the invention will now be described with Figures 5 to 7. It will be described specifically for full tooth contact which sweeps the entire working surfaces of the teeth. Ease-off at the boundaries of the working surfaces may also be used. It can be obtained by slight modifications in the production, as are customary in the gear art, and which do not need to be specifically described. Also for patent purposes it might be even assumed that such ease-off is applied by hand.

The throated worm 48, with axis 22, meshes with a wormgear 49 rotatable on an axis 23. The interference line 50 on the side meshing with side 51 of worm thread 52 is here placed adjacent end 53 of the gear teeth. It is shown slightly outside of the gear face. For convenience it is placed in a plane perpendicular to the wormgear axis 23. However it might also be assumed in any other suitable direction, as the direction indicated by dotted line 54 in Fig. 7, or in the direction of a normal section of the worm thread.

A mean point 55 of line 50 describes a circle 56 when line 50 is rotated about the wormgear axis 23. In the section shown in Fig. 6 the teeth or threads of worm 48 appear to be leaning. Side 51 has a smaller inclination to the radial direction of the wormgear than the opposite side 51'. This showing is however merely a result of the offset position of the section. In a section containing the worm axis the profiles of opposite sides 51, 51' have equal inclinations.

The two sides are symmetrical with respect to center line 24. The interference line 50' of side 51' is placed adjacent the opposite end of the wormgear teeth. Broadly the interference lines 50, 50' lie in opposite coaxial surfaces of revolution that are symmetrical with respect to the central plane 57 of rotation of the wormgear 49. These surfaces of revolution are here parallel planes.

The sides 51, 51' are also identical. And by merely turning the wormgear around about center line 24 through half a turn, the side 51' can be brought into the position formerly occupied by side 51. For this reason a description of one side will also completely describe the opposite side.

The inclination of the thread side 51 to the direction of the centerline 24 decreases from right to left (Fig. 7) in the mesh zone. It should be noted that the interference line 50 is offset from the center line 24 in the direction of decreasing inclination.

The interference line 50 may be embodied by a cutting edge of a tool, and the side surface 51 of the worm thread can then be completely described and finish-cut by moving this cutting edge about the wormgear axis 23 while the worm turns on its own axis. The ratio of the turning motions is the same as between the wormgear and worm.

The valuable mesh between this worm and the mating wormgear depends on the surface normals of the worm thread. Let us consider the path of contact in a surface of revolution obtained by rotating the circle described by an interference point about the worm axis. Point 55 is such a point. The corresponding surface of revolution is described by rotating circle 56 about worm axis 22. It may be referred to as the pitch surface of the worm.

The first task is to determine the normal to the thread surface at any position 55a. It is perpendicular to the tangent plane of the thread surface. This is the connecting plane of the direction of the interference line and the direction of relative velocity. The latter direction lies in the tangent plane of the pitch surface at the considered point 55a and is the thread direction therein. It can be determined in known manner by vectorial addition of the velocities of the worm and of the wormgear at point 55a. The inclination of this direction to the peripheral direction of the worm is sometimes called the lead angle. It will be denoted with the symbol $h$. Its amount $h_0$ at point 55 can be computed with Equation 3

$$\tan h_0 = \frac{R}{r} \cdot \frac{n}{N} \quad (3)$$

wherein R is the radius of circle 56, $r$ is the radius 22—55 (Fig. 7), and $$\frac{n}{N}$$

is the tooth ratio of the worm and gear. After the tangent plane is determined the normal 58 can be drawn. It is the one straight line that is perpendicular to the interference line 50 and to the direction of relative velocity.

Normal 58 intersects the central plane of rotation 60 of the worm at a point 61. This plane is perpendicular to the worm axis 22 and contains the wormgear axis 23 as well as the center line 24.

As the worm thread is described by the relative motion of a line 25 moving with the wormgear, normal 58 is a contact normal. It has leverages with respect to the wormgear and worm axes 23 and 22 in the proportion of the numbers of teeth and threads. By leverage is understood a combination of offset and inclination of the normal such that a load directed along the contact normal exerts turning moments on the wormgear and worm in the proportion of their tooth numbers.

When the surface normal 58 of the worm thread is turned about the worm axis it changes its leverage with respect to the gear axis 23. There is however one position in which its leverage with respect to the gear axis is the same as it was in the original position. This leverage depends on the inclination of the normal to plane 60 and on the distance of its intersection point 61 from the gear axis 22. With axes 22, 23 at right angles the said inclination stays constant in all turning positions about the worm axis. The same leverage as at point 61 is thus attained when the normal 58 is turned so that it intersects plane 60 at point 61', at the same distance from the gear axis. Points 61 an 61' lie on opposite sides of center line 24, at equal distances therefrom, on a circle concentric with the worm axis 22. The normal is then in the dotted position 58', its position of valuable contact. Point 55a of normal 58 has then moved to a position 55a' on normal 58', on a circle concentric with axis 22. The turning angle 55a—22—55a' is of course the same as the turning angle 61—22—61'. The so determined point 55a' is a point of the path of contact on the worm pitch surface that contains circle 56. Other points may be similarly determined.

As point 55 lies in plane 60 itself, its valuable contact position 55' lies on the opposite side of center line 24 at the same distance therefrom as point 55, and at the same vertical level.

The normal 62 at point 55b intersects the center line 24, at 63. No turning is needed here. The valuable contact position coincides with 55b. Here the contact is most intimate and the curvatures of the contacting surfaces are matched. This is possible because point 55b is at the end or slightly outside of the gear teeth. The intersection of the contact normal with the center line generally indicates matched curvatures and the end of useful contact.

The path of contact 64 on the considered pitch surface connects the points 55b, 55a' and 55', of which the points 55b and 55' lie slightly outside of the reach of the gear teeth. Path 64 extends obliquely across the mesh region and is always inclined to the peripheral direction of the wormgear. At point 55', in central plane 60, the inclination $j_c$ to the said direction and to the direction of the worm axis 22 is $$\tan j_c = 2 \tan h_o \qquad (4)$$

as can be readily demonstrated from the described construction.

The inclination $j_c$ is therefore larger than $h_o$ but smaller than $2 h_o$.

The surface of action intersects plane 60 in a vertical line passing through point 55' (Fig. 7), and more broadly in a line which is the profile of the surface of revolution coaxial with the wormgear. This surface is the mirror image of the surface of revolution containing the interference line (50), with respect to the central plane of rotation (57) of the wormgear, as follows from the described geometrical construction.

It should be noted that the tooth contact extends all across the width of the wormgear. Also comparatively moderate profile inclinations are feasible, so that the tooth depth may be increased if desired.

Figure 9:
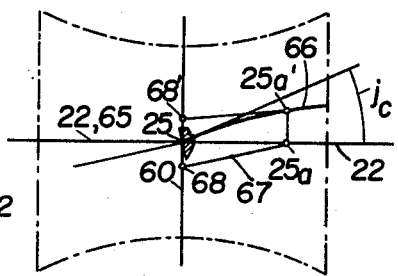
Figure 9 is a diagrammatic plan view of a throated worm, illustrating for comparison the mesh of a known form of worm gearing.

For comparison, Fig. 9 shows the valuable contact in a known type of enveloping worm gearing, in which the mean point of the interference line lies in the axial plane 65 of the worm. The path of contact 66 in the pitch surface is determined as described above. Its one end is at the critical point 25, where contact is most intimate. Its inclination $j_c$ there is given by Equation 4. The normal 67 at any point 25a of the path of the considered intereference point intersects the central plane of rotation 60 of the worm at a point 68. Normal 67 is now turned about the worm axis 22 until its point 68 reaches position 68', on the opposite side of axial plane 65 and at the same distance therefrom as point 68 has. Point 25a of normal 67 is then in a position 25a', and is a point of the path of contact 66. Although the valuable mesh is here confined to one quadrant, such worm gearing has shown up very well in practice.

Further embodiment

Another embodiment will now be described with Figures 10 to 13. Here the interference line lies within the side surface 70 to a wormgear tooth. This surface is thereby divided into a working portion 70', at the right (Fig. 12), and a relieved portion 70" smaller than the working portion. The relieved portion represents the interference portion and is slightly inclined to the working portion. In principle the two portions meet at an edge, which however may be rounded off. The relieved portion has no tooth contact in any actual running position. In Fig. 12 it is shown covered with dots. The working portion 70' extends on both sides of the central plane of rotation 71 of the wormgear, which plane also contains the center line 24. The worm 72 and wormgear 73 are mounted in intermeshing relation to turn on axes 22 and 23 respectively.

The interference line 74 is offset from the center line 24 in the direction of decreasing inclination of the thread surface to the direction of center line 24. Mean point 75 of the interference line 74 describes a circle 76 as the line is rotated about the gear axis 23. Again we may consider the mesh in a pitch surface, 77, which is a surface of revolution coaxial with the worm 72 and containing circle 76. The geometrical construction of the mesh conditions and path of contact is as described above.

Point 75 of the central plane 60 becomes a point of valuable mesh in the position 75' on the opposite side of center line 24 and at an equal distance therefrom. Like point 75 it lies on circle 78, the intersection of the pitch surface 77 with central plane 60, the plane of the throat of the worm, where the worm diameter is smallest.

At point 75b of circle 76 the surface normal 80 of the described worm-thread side 81 intersects the center line 24. Point 75b is thus the end point of the path of contact 82, and its point of most intimate tooth contact. At point 75' the path 82 is inclined to the direction of the worm axis at an angle $j_c$ as determined from Equation 4. The path 82 extends beyond point 75' and covers most of the length of worm 72 and the major part of the width of the wormgear 73. Many teeth are in simultaneous contact and share the load.

Figure 13:
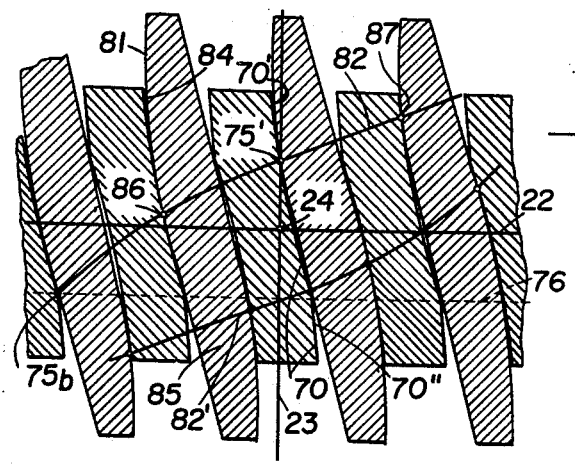

Fig. 13 illustrates the mesh in a cylindrical section coaxial with the wormgear and containing circle 76, the cylindrical sectional surface having been developed into a plane. The gear teeth have sectional profiles 84, identical on all teeth because the sectional surface is coaxial with the wormgear. These profiles contact the profiles of the worm threads or teeth 85 along two paths of contact 82, 82', one for each of the two sides of the teeth. The thread side 81 has tangential contact at points 75b, 86, 75', 87 of the path of contact 82. The opposite thread side has similar contact. The intimacy of contact is high, and it increases towards point 75b. At this point the curvatures of the contacting sectional profiles are identical. At other points, like point 87, the sectional worm profile is more curved than the concave gear profile 84. Thus the contacting profiles separate on both sides of the contact point 87. Further on towards circle 76 they approach again, and it it weren't for the relief at 70" they would cut into each other at circle 76. The relief is made sufficient to avoid actual contact at the interference region. Its slope or inclination to the working portion 70' may be chosen at will, as long as it is sufficient to avoid interference.

Similarly the curves contacting at point 75' and at point 86 first separate and then approach again to intersect on circle 76, if it weren't for the relief at 70". The interference point stays at the same place on the gear tooth in all turning positions. With the shown disposition actual interference is avoided, and yet it is close enough to provide the most intimate tooth contact possible.

While the interference line 74 is offset from the center line 24 in the direction of decreasing inclination of the thread side with respect to the direction of the center line 24, the path of conact 82 is offset therefrom in the direction of increasing inclination, that is to the opposite side. In this way the contacting surfaces clear each other adjacent the region of contact.

The interference line 74 is inclined to the central plane of rotation 71 of the wormgear. This plane is perpendicular to the wormgear axis 23 and contains the worm axis 22 and center line 24. While any desired inclination may be used, the one shown has a specific purpose. It is so chosen that for all practical purposes the surface normals of the worm thread at all points of circle 76 have a constant leverage with respect to the worm axis. This means also that the normals at all points of the pitch surface 77 have a constant leverage. A given force acting along any of these normals exerts a constant turning moment on the worm. Ordinarily the turning moment varies with the changing diameter of the worm.

A constant leverage is found to improve the adjustment characteristics of the wormgear pair. Line 74 lies in a surface of revolution coaxial with the wormgear and tangent to the surface normal 79 at point 75. At point 75 of plane 60, at the throat of the worm, the normal 79 and the interference line 74 or its tangent seemingly coincide in the view along the worm axis, Fig. 12.

The validity of this construction to achieve constant leverage can be demonstrated mathematically.

Line 74 is shown straight, but may also be curved. If curved, its shape may be determined to secure constant leverage also at points up and down from mean point 75.

A straight line extending through point 75 in the direction of interference line 74 intersects the central plane 71 between the worm axis 22 and the outside circle 89 of the wormgear, in this plane.

As the interference line 74, 50 lies on the worm thread in all its turning positions, a thread side has a constant profile from end to end of its working portion. This profile has a constant position with respect to the axis 23 about which it turns. The constant profile describes and lies on a surface of revolution coaxial with the turning axis 23.

In both described embodiments the surface of action and the path of contact cross the central plane of rotation 57, 71 of the wormgear and extend on both sides of said plane. The embodiment of Figures 5 to 7 requires no relieved portions on the wormgear teeth to prevent interference. Its surface of action of a thread side lies wholly on one side of the throat of the worm. It lies on the side of larger inclination of the thread surface to the direction of the center line of the worm and wormgear. The opposite thread side has a surface of action on the opposite side of the throat. In the embodiment of Figures 10 to 13 the tooth action of each thread side is extended to both sides of the throat of the worm, and relieved portions are provided to avoid interference.

Other embodiments

Now that the path of contact and surface of action has been determined so that interference is at a constant line on or off a gear tooth surface, we may also start out from the path of contact and surface of action, and assume them following the above determined paths. The worm and wormgear may then be produced in any suitable way giving such paths of contact or approximations thereof.

As an example reference is made to my application entitled "Gearing," filed November 1, 1955, Serial No. 544,270, in which a tooth shape for worm gearing is disclosed that is capable of form-cutting, and where the tooth shape can be described on both the worm and wormgear by a pair of counterpart cutting edges that move in a helical path across the mesh zone, while the worm and wormgear rotate in timed relation. The helical surface thus described constitutes the surface of action between the worm and wormgear. According to the present invention, it is determined to follow the above described path of contact. Thus, in Fig. 8, the helical path 90 with axis 91 follows path 45. And helical path 90' coaxial with path 90 follows path 45'.

A cutting edge then describes a helical surface of constant lead. Like path 45, it crosses the central plane of rotation 71 of the wormgear. The thread surface thus produced on the worm has a constant profile all along the length of its working portion. This constant profile lies in a helical surface of constant lead, with axis 91.

The portions of the gear teeth that are relieved to avoid interference, like portions 70" of Fig. 13, may be applied in a separate roughing operation. Surface normals of constant leverage may be produced at all points of helical path 90 and path 90' by using a cutting edge of specific direction. The cutting edge then lies in a helical surface that is tangent to the tooth surface normal at a midpoint.

When the axes of the worm and wormgear are at other than right angles the principle of starting out from an interference line may also be used. But the determination of the mesh is more complicated. Broadly a normal of the worm thread at the interference line is turned about the worm axis until it again has the same leverage with respect to the wormgear axis. Thi problem may be solved with the known methods of geometry.

Generally there is less interference on angular worm drives than on right-angle worm drives. Less offset or no offset of the surface of action from the center line is required.

Production

Production with a helically moving cutting edge, that engages a rotating worm or wormgear to be finished, has already been referred to. Approximation methods by hobbing and others may only be mentioned.

A method more in line with the current procedure will now be described. Here the worm is produced with one or more cutting tools that move about an axis corresponding to the wormgear axis 23 while the worm being cut turns on its own axis at the tooth ratio of the gear pair, as if the gear were meshing with the worm.

Both sides of a worm thread may be cut simultaneously with a pair of spaced tools. The tools are positioned so that their finishing edges lie on opposite sides of the mean or central plane of rotation of the gear. The mean point 75 of the finishing edge of one tool then describes a circle 76 (Figures 10 and 11), while the means point of the finishing edge of the other tool describes an equal circle 76' (Fig. 10). A finishing edge is identical with and represents the above described interference line 74 or 50. The tools are relieved to provide cutting clearance. With this procedure the two tools of a pair require different relief because of their different cutting position.

The same tool may be used on both sides of a worm thread when the two sides are cut successively. After one side of the thread or threads has been cut, the worm blank may be turned around about center line 24, so that the opposite side reaches the position formerly occupied by said one side. And cutting proceeds as on said one side.

When the tool is so placed that the tool body is on the outside, at the left of edge 74 (Fig. 12), then the end of the tool, adjacent the bottom of the worm thread, may lie in a cylindrical surface coaxial with the axis 23 about which the tool turns. Cutting clearance is obtained because of the offset position of the tool, whose cutting face is at the right end of the tool. And the relieved side surface of the tool, with cutting edge 74, may be made a helical surface coaxial with its turning axis 23. Then after sharpening the tool it is advanced to cutting position by moving it along and about its axis. No depthwise adjustment radially of its axis is needed.

This is important when a plurality of identical tools are provided and spaced on a circle 76 about the turning axis, occupying the entire circumference of this circle in the manner of gear teeth. They may be formed integral with each other or arranged in segments. Such arrangements are here especially practical because no relative adjustment between the individual tools is needed to restore identical cutting conditions. These are obtained with the same adjustment along and about their common axis 23.

When required, interference during the depth feed may be avoided by using tools narrower than the thread space and by slightly turning the tool assembly during the depth feed.

If desired, I may relieve the portion of a thread side which has no working contact.

The wormgear may be cut with a hob representing the worm, as is present practice. The hob is relieved to provide cutting clearance, and is therefore bound to change after sharpening. Yet it should turn out the same wormgear shape.

For finishing I preferably employ hobs with little or no end relief, with side relief to provide cutting clearance on the side edges. A roughing cut somewhat deeper than the finishing cut may be used prior to finishing, thus taking off the cutting load from the end edges of the finishing hob. To produce a constant wormgear shape the finishing hob is kept in a constant position during its life, using the same center distance.

Its side relief is an angular relief about the axis 23 about which the relieving tool is turned. To the uniform turning motion of the relieving tool is added a uniform relieving motion about the same axis, repeating with each cutting tooth passing under the tool. This angular relieving motion is added in the same direction as the continuous turning motion on one side of the cutting teeth, and in the opposite direction on the opposite side, as is readily understood.

Gashing also presents a problem on a throated or hourglass type hob. I preferably provide gashes that extend along the path of the relieving edge. This path is also the surface described by the interference line 74 and by the edge that cuts the worm thread. It is a surface of revolution coaxial with the turning axis of the relieving tool. Such a gash is indicated in dotted lines 92, 92' in Fig. 12. Its location corresponds to a vertical position of the turning axis. 92 is the cutting face, the cutting tooth being below it. Except for a possible hook at its outer end this cutting face is essentially a somewhat internal conical surface, while the rear side 92' of the gash is here a plane surface. Dotted line 93 of Fig. 11 is the projection of the circle that passes through pitch point 94 and lies in the conical cutting face. While the cutting face 92 seems to give only a blunt cutting edge, its cutting angle is improved by the lead angle of the hob thread, as the considered cutting edge lies on the thread side 81.

Line 74' of the opposite thread side may also be embodied as a hob cutting edge. A hob to rotate in the same direction as the hob with cutting face 92 has its cutting tooth to the left of edge 74' in the shown turning position. The cutting face containing edge 74' is essentially an external conical surface with axis 23. Such a cutting face has ample front rake. On that side the lead angle of the hob tends to increase the cutting angle, so that this cutting edge is not weak. While the lead angle unbalances the cutting angles of opposite sides, the negative and positive front rakes provided by the two different cutting faces act in the opposite direction, and tend to restore balance.

It should be understood that some modifications may be made in the described procedure to effect a slight amount of crowning.

When production warrants the use of more than one hob, I preferably provide one hob with cutting faces 92 for finishing one side of the wormgear teeth, and another hob with the last-described cutting faces for finishing the opposite side. This pair of hobs may be used simultaneously in a machine with two hob spindles disposed on opposite sides of the wormgear blank. Interference during the in-feed is avoided by keeping the hob threads thinner than the tooth spaces engaged thereby, and by cutting off the hobs on one side. Thus the hob which represents the discussed thread side 51 of the worm 48, Fig. 6, is cut off at the right, at about the right end of the dotted line 95 which represents a cutting face. Similarly the hob which represents the thread side 81 of worm 72 is cut off at about the right end of dotted line 93. On the left end however the hob length may be extended over the length of the length of the worm. The hob threads then have different diameters at opposite ends. And their ends have different distances from their throats, that is from their region of minimum diameter.

When production is moderate, and at lead angles of the worm of thirty degrees or larger regardless of production, I preferably use a single finishing hob for both sides of the wormgear teeth, and cut the two sides one after the other. Either of the two described hobs can be used to finish each of the two sides.

Thus the hob with gashes 92, 92' may represent side 81 of the threads of worm 72 (Fig. 11) and finish the mating side of the wormgear teeth. Then the wormgear is rechucked, after having been turned around by half a turn about center line 24, so that the opposite side of the teeth is in the position formerly occupied by the side cut first. And the second side is cut in the same manner as the first.

Instead of turning the wormgear around it is also possible to turn the hob around. Then the direction of rotation should be reversed on both the hob and the wormgear.

Figure 7:
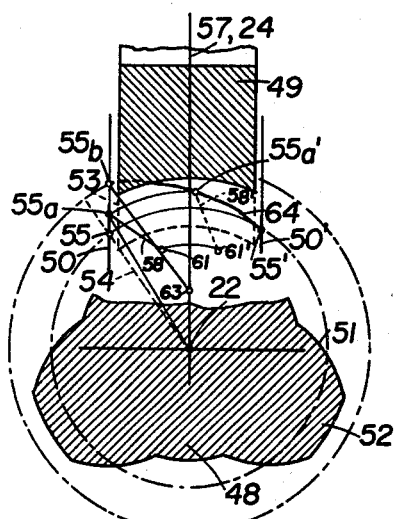

The described procedure is also followed when other interference lines are used, such as line 54 or line 50 of Fig. 7. Here one hob of the described pair of hobs has distinctly keener finish cutting edges than the other or is otherwise preferable from the other. This hob is used when the two sides of the wormgear teeth are cut successively with a single hob.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

I claim:

1. Enveloping worm gearing comprising a throated worm and a wormgear with concave tooth bottoms, having intermeshing teeth, the side surfaces of the teeth being shaped to have tangential contact along a single surface of action extending obliquely across the mesh region, on each of the two opposite sides of the teeth, said surface of action bypassing the center line connecting the worm and wormgear axes on the side of larger inclination of the tooth surfaces to the direction of said center line and extending on both sides of the central plane of rotation of the wormgear, the side surfaces of the teeth of said worm having an approximately constant profile in a surface of revolution offset from said center line and whose axis extends adjacent to and in the same direction as the worm gear axis.

2. Enveloping worm gearing according to claim 1, wherein at the throat of the worm the surface of action is inclined to the direction of the worm axis less than twice the lead angle of the worm but more than said lead angle.

3. Enveloping worm gearing according to claim 1, wherein the surface normals at the points of contact have a varying distance from the center line, said distance decreasing with increasing inclination of the contacting surface portions to the direction of said center line, and being smallest adjacent one end of the worm thread, on each of the two sides of said thread.

4. Enveloping worm gearing according to claim 3, wherein the normal adjacent one end of the worm thread nearly intersects the center line of the worm and wormgear.

5. Enveloping worm gearing comprising a throated worm and a wormgear in mesh therewith, said worm and wormgear having a surface of action bypassing their center line and being offset therefrom in the direction of increasing inclination of the tooth side surfaces to the direction of said center line, each side surface of a wormgear tooth comprising a working portion and a relieved portion smaller than said working portion and without tooth contact in any actual running position, said two portions being slightly inclined to each other, the side surfaces of the teeth of said worm having an approximately constant profile in a surface of revolution offset from said center line and whose axis extends adjacent to and in the same direction as the worm gear axis.

6. Enveloping worm gearing comprising a throated worm and a wormgear in mesh therewith, said worm and wormgear having a surface of action bypassing their center line, each side surface of a wormgear tooth having a working portion and a relieved portion smaller than said working portion and joining it approximately along an interference line offset from the midplane of the wormgear.

7. Worm gearing according to claim 6, wherein the working portion and the relieved portion of a gear-tooth side join along a line inclined to the central plane of rotation of the wormgear and extending wholly on one side of said plane.

8. Worm gearing according to claim 6, wherein said joining line lies approximately in a surface of revolution coaxial with the wormgear, the tangent plane of said surface at the mean point of said joining line containing the surface normal of the adjacent worm-thread surface.

9. Worm gearing according to claim 7, wherein the extended joining line of the working portion and relieved portion intersects the central plane of rotation of the wormgear at a distance from the wormgear axis larger than the outside radius of the wormgear in said plane and smaller than the center distance of the worm and wormgear.

10. Worm gearing according to claim 6, wherein said interference line is a straight line inclined to the central plane of rotation of the wormgear.

11. Enveloping worm gearing comprising a throated worm and a wormgear with concave tooth bottoms meshing therewith, said worm and wormgear having a surface of action crossing the central plane of rotation of the wormgear in a region offset from the center line connecting the axes of the worm and wormgear and lying wholly on one side of the throat of said worm.

12. Enveloping worm gearing comprising a throated worm and a wormgear meshing therewith, the side of a worm thread having a constant profile from end to end of its working portion, said profile having a constant position with respect to an axis offset from and angularly disposed to the axis of said worm, so that as the worm turns on its axis said profile describes a surface coaxial with said offset axis, said profile being so positioned that its mean point bypasses the center line between said axes by at least half a circular pitch of the wormgear, and said wormgear being formed conjugate to said worm to transmit uniform motion between them.

13. Worm gearing according to claim 12, wherein said surface is a helical surface of constant lead.

14. Enveloping worm gearing comprising a throated worm and a wormgear meshing therewith, the side of a worm thread having a constant profile from end to end of its working portion, said profile having a constant position with respect to an axis offset from and angularly disposed to the axis of said worm and having a fixed position lengthwise of said axis, so that as the worm turns said profile describes a surface of revolution coaxial with said offset axis, said lengthwise position being such that said surface of revolution bypasses the center line of its axis and the worm axis, and said wormgear being formed conjugate to said worm to transmit uniform motion between them.

15. Worm gearing according to claim 14, wherein the surface of revolution containing said constant profile is a conical surface whose axis approximately coincides with the axis of the wormgear.

16. Worm gearing according to claim 14, wherein said constant profile lies in a surface of revolution whose axis is at right angles to and offset from the axis of the worm, said surface of revolution being approximately tangent to the normal of the thread surface at a mean point of said profile, at the throat of the worm.

17. Enveloping worm gearing comprising a throated worm and a wormgear with concave tooth bottoms conjugate thereto and meshing therewith, said worm having a constant profile shape in a surface of revolution immediately adjacent one of the two end surfaces of the wormgear teeth.

18. Enveloping worm gearing comprising a throated worm and a wormgear with concave tooth bottoms conjugate thereto and meshing therewith, said worm having an approximately constant profile shape in a surface of revolution that lies at least partly outside of one of the two end surfaces of the wormgear teeth and that extends in the same direction as said one end surface at the throat of the worm.

References Cited in the file of this patent

UNITED STATES PATENTS

| | | |
|---|---|---|
| 1,683,163 | Cone | Sept. 4, 1928 |
| 1,694,028 | Wildhaber | Dec. 4, 1928 |
| 1,746,722 | Trbojevich | Feb. 11, 1930 |
| 1,792,782 | Trbojevich | Feb. 17, 1931 |
| 1,815,685 | Trbojevich | July 21, 1931 |
| 1,902,683 | Wildhaber | Mar. 21, 1933 |
| 1,903,318 | Wildhaber | Apr. 4, 1933 |
| 2,069,433 | Wildhaber | Feb. 2, 1937 |
| 2,123,265 | Wattie | July 12, 1938 |
| 2,279,414 | Scott | Apr. 14, 1942 |
| 2,302,942 | Golber | Nov. 24, 1942 |
| 2,432,246 | Mackmann et al. | Dec. 9, 1947 |
| 2,619,845 | Mackmann et al. | Dec. 2, 1952 |
| 2,620,549 | Klomp | Dec. 9, 1952 |
| 2,654,944 | Wilson | Oct. 13, 1953 |
| 2,674,030 | Wildhaber | Apr. 6, 1954 |
| 2,698,988 | Klomp | Jan. 11, 1955 |